Nov. 28, 1967     W. P. SIEGMUND ET AL     3,355,273
METHOD FOR MAKING BUBBLE FREE FIBER OPTICAL IMAGE-TRANSFER DEVICES
Filed Nov. 19, 1962     2 Sheets-Sheet 1

INVENTORS
WALTER P. SIEGMUND
HENRY B. COLE
By James P. McAndrew
ATTORNEY

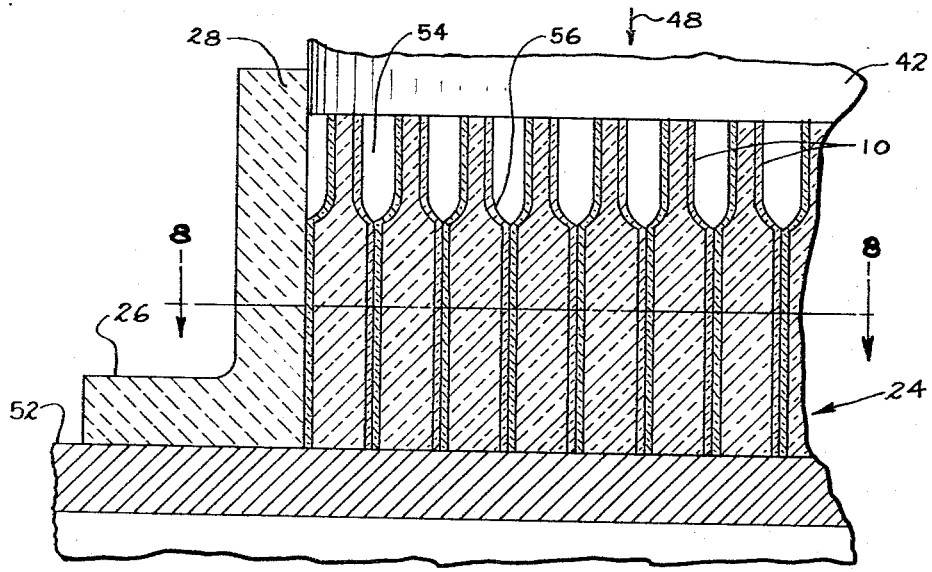
Fig. 7
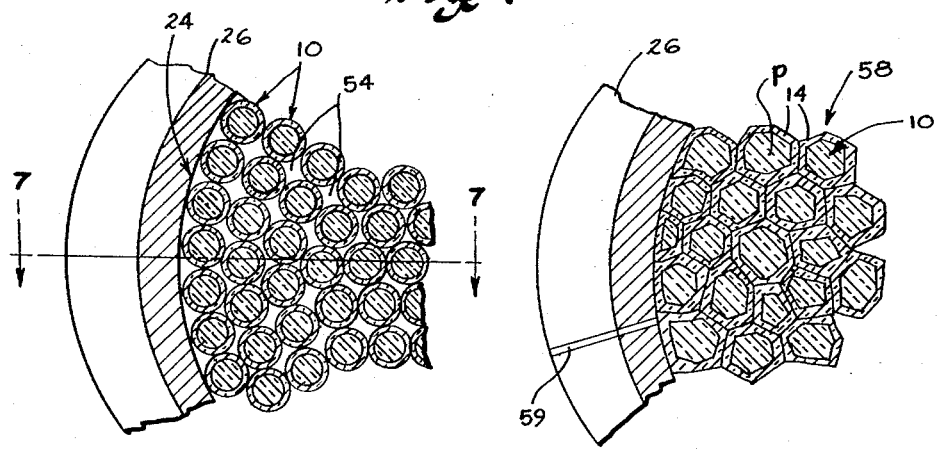
Fig. 6
Fig. 8
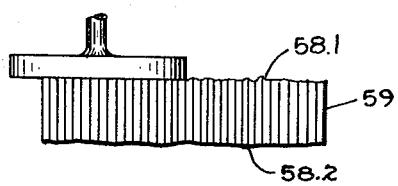
Fig. 9
INVENTORS
WALTER P. SIEGMUND
HENRY B. COLE
By James P McAndrew
ATTORNEY 3,355,273
METHOD FOR MAKING BUBBLE FREE FIBER OPTICAL IMAGE-TRANSFER DEVICES
Walter P. Siegmund, Woodstock, and Henry B. Cole, East Woodstock, Conn., assignors, by mesne assignments, to Warner-Lambert Pharmaceutical Company, Morris Plains, N.J., a corporation of Delaware
Filed Nov. 19, 1962, Ser. No. 238,394
1 Claim. (Cl. 65—4)

The field of this invention is that of fiber optical image transfer devices and the invention relates more particularly to novel and improved methods for manufacturing such devices.

Conventional fiber optical image transfer devices incorporate a multiplicity of light-conducting optical fibers, each embodying a core part of light-transmitting material of relatively high index of refraction and a cladding of light-transmitting material of relatively low index of refraction. These fibers are arranged in side-by-side relation in a bundle so that corresponding opposite ends of the fibers cooperate to define mosaic faces at respective opposite ends of the bundle. The fibers are then heated to the fusing temperature of the fiber materials and are compressed for fusing the fiber claddings together in vacuum-tight relation, to form an integral device. As will be understood, a light image can be formed upon one mosaic end face of this device so that light from respective segments of the image can be received within the core parts of various device fibers. The light received within each fiber core can be conducted therethrough by repeated reflection of the light from the interface formed between the fiber core and its cladding in accordance with well-known principles of total internal reflection, thereby to reproduce the original light image in mosaic form upon the opposite end face of the device.

In manufacturing such image transfer devices, by conventional methods, bubbles are frequently formed and trapped within the device between the device fibers and these bubbles tend to interfere with light transmission through individual light fibers. For example, gasses originally disposed in interstices between the device fibers can be trapped between portions of the fibers as other portions of the fibers are fused together. In addition contaminants caught between device fibers can form bubbles by being volatilized as the fibers are heated and fused together. Most frequently, bubbles are formed when gasses dissolved in the fiber materials are expelled or outgassed as the fibers are heated. Generally, bubbles formed by trapping of gasses in fiber interstices or by volatilization of contaminants caught between fibers are supplemented and enlarged by gasses expelled from the fiber materials. As these bubbles are customarily formed when the fiber materials are in a semi-fluid state at fusing temperature, the bubbles tend to assume a spherical shape and to block the transmission of light through one or more device fibers, thereby to seriously reduce the quality of the mosaic image reproduced on the output end face of the device.

It is an object of this invention to provide novel and improved methods for manufacturing fused fiber optical image transfer devices; to provide methods for manufacturing such image transfer devices which are capable of transferring and reproducing mosaic light images of improved quality; and to provide such methods of device manufacture which are economical to perform. It is also an object of this invention to provide such methods of device manufacture which significantly reduce the formation and entrapment of bubbles within the device.

Briefly described the methods provided by this invention include the initial step of furnishing a multiplicity of light-conducting optical fibers which, for example, can each embody a core part of light-transmitting material of relatively high index of refraction having a cladding of light-transmitting material of relatively low index of refraction. These fibers are arranged in side-by-side relation in a bundle so that corresponding opposite ends of the fibers cooperate to define mosaic faces at respective opposite ends of the bundle. Preferably, the bundle of fibers is closely confined around its periphery. In accordance with this invention, a zone of super-atmospheric pressure is established and maintained in surrounding relation to the bundles of fibers, and preferably, the fluid pressure established and maintained in this zone exceeds the equilibrium vapor pressure of gasses dissolved in the fiber materials at the fusing temperature of the materials. The fibers are then heated to fusing temperature within the pressure zone for fusing the fibers together to form an integral image-transfer device. Most advantageously, the fibers are heated so that portions of the fibers are initially brought to a fusing temperature in a zone extending transversely through the fiber bundle and so that other portions of the fibers are then brought to a fusing temperature progressively outward from the zone of initial fusion along the length of the fibers. In this system, the fibers can be compressed into fused relation with each other progressively along the length of the fiber as the fiber materials are heated to fusing temperature. Preferably, where the fiber bundle is initially confined around its periphery, the bundle fibers are heated to fusing temperature progressively from end-to-end of the fibers and the fibers can be compressed axially of the fibers for bulging portions of the fibers into intimate relation with each other as they are brought to fusing temperature. In accordance with this invention, the fluid utilized in establishing the above described pressure zone can be a gas or other fluid which can be readily dissolved in the fiber materials.

In this system, care can be exercised in conventional manner to avoid contamination of the fiber bundle with dust for other extraneous matter, thereby to minimize bubble formation in a device such as might be caused by volatilization of such contaminants. Further, the zone-fusing of the bundle fibers can minimize bubble formation which might be caused by entrapment of gasses originally disposed in interstices between the fibers. That is, where the fibers are brought into fused relation in a zone moving progressively along the length of the fiber, gasses originally disposed in the fiber interstices tend to be swept out of the interstices as the zone of fusion progresses along the length of the fiber bundle. Most important, as a result of the uniform fluid pressure maintained around the exterior of the device fibers in the above-described pressure zone, gasses which are dissolved in the fiber material, and which would tend to be expelled from the material as the fluidity of the material increases and as the solubility of the gasses in the material may decrease during the heating of the fiber materials to fusing temperature, cannot agglomerate as bubbles within the device. Further, where the gas used in establishing said pressure zone can be readily absorbed by the fiber material, such bubbles as may be formed by entrapment of said gas between device fibers can be dissolved in the device material under the fluid pressure exerted on the device.

Other objects, advantages and details of the methods provided by this invention appear in the following detailed description of a preferred embodiment of the invention, the detailed description referring to the drawings in which:

FIG. 6 is a partial section view to enlarged scale along line 6—6 of FIG. 5;

FIG. 7 is a partial section view along line 7—7 of FIG. 6;

FIG. 8 is a partial section view to enlarged scale along line 8—8 of FIG. 7; and FIG. 9 is a diagrammatic view illustrating a final step in the method of this invention.

Figure 1:
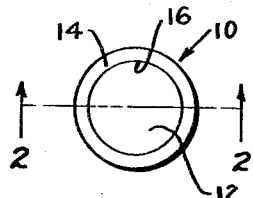
FIG. 1 is an end view of an optical fiber embodied in the image-transfer device provided by the method of this invention.
Figure 2:
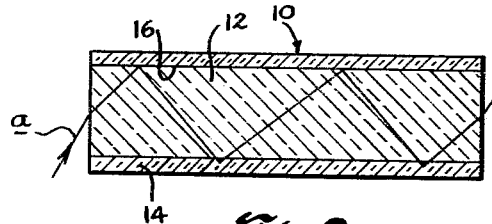
FIG. 2 is a section view along line 2—2 of FIG. 1.

Referring to the drawings 10 in FIGS. 1 and 2 indicates a light-conducting optical fiber which can be embodied in an image-transfer device formed according to the methods of this invention. As illustrated, the fiber can include a core part 12 of a light transmitting material of relatively high index of refraction and can have a cladding 14 of light-transmitting material of relatively low index of refraction forming light-reflecting interface 16 therebetween. As shown in FIG. 2, a light ray $a$ received within the core part of the fiber 10 to be incident upon the fiber interface 16 can be totally internally reflected from the interface a repeated number of times to be conducted through the length of the fiber core in accordance with well known principles. Various light-conducting materials can be used in forming the fibers 10 but preferably the fibers are formed of glass materials having generally similar fusing and drawing temperatures and having similar coefficients of thermal expansion. For example, in a preferred embodiment of the fiber, the fiber core can be formed of barium flint glass having a refractive index of 1.66 and the fiber cladding can be formed of soda lime glass having a refractive index of 1.52.

Figure 3:
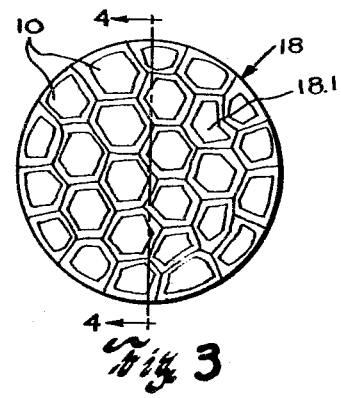
FIG. 3 is an end view of a conventional fiber optical image-transfer device.
Figure 4:
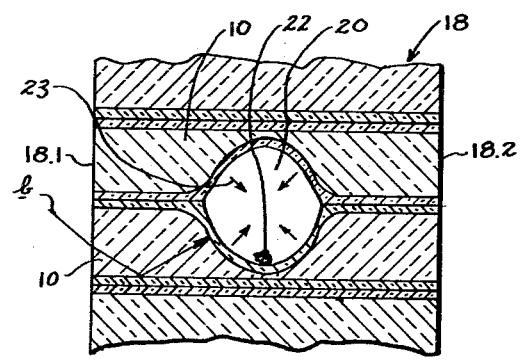
FIG. 4 is a partial section view along line 4—4 of the FIG. 3.

In conventional fiber optical image-transfer devices such as shown at 18 in FIG. 3, a multiplicity of light-conducting optical fibers such as the fibers 10 can be arranged in side-by-side bundled relation and can be secured in such bundled relation by fusing of the fiber claddings. In these devices, corresponding opposite ends of the fibers cooperate to define mosaic faces at respective opposite ends of the device 18, only one of these faces 18.1 being shown in FIG. 3. In conventional fiber optical devices of this sort, bubbles 20 are frequently trapped between device fibers as illustarted in FIG. 4. For example, a bubble 20 may be trapped between fibers 10 within the device 18 when gasses originally disposed in an interstice between the fibers are enclosed as the fibers are initially fused together adjacent the device faces 18.1 and 18.2 before the gasses are permitted to escape from the interstice. Alternatively, the bubble 20 may be formed by volatilization of a contaminating particle 22 caught between the device fibers during heating of the fibers to a fusing temperature. Further, a bubble may be formed when gasses dissolved in fiber material are expelled from the material, as indicated by the arrows 23, as the fibers are heated to a fusing temperature during formation of the device 18. Frequently, one or more of these effects may contribute to formation or enlargement of the bubble, and, generally, as the bubbles will be initially formed when the fibers are in a semi-fluid state at fusing temperature during formation of the device 18, the bubbles tend to assume spherical shape and to displace or expand into adjacent fibers. As will be understood, a light ray $b$ received within the core of a fiber which has been deformed or displaced intermediate its ends by formation of a spherical bubble 20 will be intercepted and blocked by the bubble so that the light ray cannot reach the output end face 18.2 of the device for contributing to the reproduction of a mosaic light image on said end face.

Figure 5:
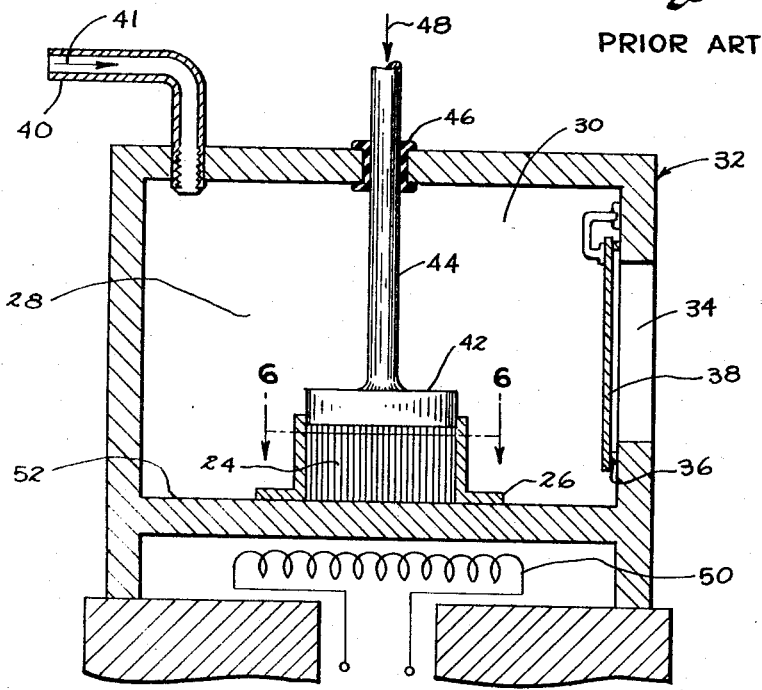
FIG. 5 is a diagrammatic vertical section view through an apparatus which can be used in performing the method of this invention.

In accordance with this invention, a multiplicity of optical fibers can be arranged in side-by-side relation to form a bundle 24 which is preferably confined within flanged sleeve 26 for holding the fibers in said bundled relation. A superatmospheric pressure zone 28 can then be established and maintained in surrounding relation to the confined fiber bundle. For example, as illustrated in FIG. 5, the confined fiber bundle can be disposed within a sealed chamber 30 within a housing 32. Such a chamber can be provided within opening 34 which can be sealed in conventional manner by gasket means 36 and a door 38, whereby the fiber bundle can be conveniently placed within and removed from the fusing chamber. As will be understood, any suitable gas can be pumped within the chamber 30 through a nipple 40 by any conventional pumping means, as indicated in FIG. 5 by the arrow 41, for maintaining fluid pressure within the pressure zone 28 at any selected level. A compressing member 42 can then be disposed in abutting relation to the ends of the fibers within the bundle 24 and can be adapted by means of a shaft 44 which extends exteriorly of the chamber 30 through a gasket means 46 for applying an axially pressing force to the bundle fibers by a movement of the pressing member in a direction of the arrow 48. A heating means such as is diagrammatically indicated by the electric heating coil 50 can be disposed beneath the base 52 of the housing chamber 30 for heating the bundle fibers to fusing temperature. As will be understood, the disposition of the heating means beneath the housing base in this manner can serve to initially heat the fiber bundle materials to fusing temperature in a zone extending parallel to the housing base immediately adjacent to the base, and thereafter to heat the fibers to fusing temperature progressively upward along the lengths of the fibers.

As shown in FIG. 6, the fibers 10 forming the bundle 24, can be round in cross-sectional configuration so that interstices 54 will appear at regular intervals between the fibers. Alternatively, the fibers embodied in the bundle 24 can be of square, hexagonal or other cross-sectional configuration, whereby the fibers are adapted to fit compactly together with only random interstices such as may inadvertently occur therebetween. Further, multifiber units each embodying a plurality of cores of light-transmitting material of relatively high index of refraction in side-by-side spaced relation within a matrix of a light-transmitting material of relatively low index of refraction could be substituted for the individual fiber 10. The compressing member 42 can then be moved downwardly to exert an axially compressing force on the fibers 10 and, at the same time, the fibers can be heated to a fusing temperature progressively upward from the base of the housing 32. In this manner, as shown in FIG. 7, the fibers confined within the sleeve 26 can bulge outwardly as at 56 into intimately fused relation with adjacent fibers under this axially compressive force as the fiber materials are brought to fusing temperature. As fusing temperature of the fiber materials will be first achieved adjacent the housing base 52 and will progress upwardly, along the length of the fibers, the fibers will be fused into intimate relation with each other initially adjacent the base 52. This zone of fusion will then progress upwardly, along the lengths of the fibers as will be understood. This means that the interstices 54 between the device fibers will be progressively closed from one end to the other of the fiber bundle, so that gasses originally disposed in the interstices will be swept therefrom ahead of the advancing zone of fusion. In this manner, as shown in FIG. 8, the claddings 14 of the fibers 10 can be fused together in vacuum-tight relation for forming an integral image-transfer device 58.

It will be understood that a method such as that described above wherein bundle fibers are initially fused together in a zone extending transversely through the fiber bundle and are thereafter fused together progressively along the lengths of the fibers from the zone of initial fusion is commonly known as a zone-fusing process. In accordance with this invention, it is preferred that the fibers 10 be fused together in a zone-fusing process and preferably in the zone-fusing process which has been specifically described. However, it should be understood that various other known procedures for heating and compressing fibers in a bundle for fusing the fibers together to form an image-transfer device could also be employed within the scope of this invention.

After the device 58 has been formed, the device is preferably permitted to cool to a suitable extent within the pressure zone 28 for substantially solidifying the device materials. The super-atmospheric pressure established within pressure zone 28 can then be released from within the chamber 30 through the nipple 40 as will be understood and the device 58, confined within the sleeve 26, can be removed from the chamber 30. Preferably, the device 58 can be removed within the sleeve 26 in any conventional manner, as by severing the sleeve as shown at 59 in FIG. 8, and opposite end faces 58.1 and 58.2 of the device can be optically finished by any conventional means as is diagrammatically indicated in FIG. 9 by the abrading tool 60.

It will be understood, that where the fibers 10 embody barium flint and soda lime glass materials as previously described, the fiber materials will have one or more different gasses dissolved therein. These gasses will be completely retained within the materials when the fibers are in solid form. However, as these fibers are heated to fusing temperatures on the order of 1150° F. for fusing the fibers together, the solubility of many of the gasses in the glass materials may substantially decrease at the same time that the fiber materials are heat-softened to a semifluid state. Accordingly, these and other dissolved gasses will tend to be outgassed or expelled from the fiber materials as the materials are heated.

Ordinarily, the escape of these dissolved gasses from the surface of the fiber materials into the atmosphere surrounding the fibers being fused is of no significance. However, when the glass materials are heated to relatively high fusing temperatures, the tendency of the gasses to escape from the glass material becomes relatively high and tends to exceed the external pressures exerted on the glass materials so that the gasses may agglomerate within the fiber materials or between fused fibers to form bubbles. That is, this tendency of the gasses to escape from the semi-fluid glass materials at fusing temperature may become so high as to form bubbles having sufficient internal pressure to displace the semi-fluid glass materials against the external forces exerted on the materials. Such gasses are particularly likely to escape from the glass materials into very small bubbles which have originally been formed around contaminants caught between device fibers or around small bubbles which have been trapped in fiber interstices during fusing of the fibers.

In accordance with this invention, a gas such as air, or preferably an inert gas such as helium or argon, can be introduced into the chamber 30 illustrated in FIG. 5 for establishing and maintaining a fluid pressure in the zone 28 which substantially exceeds the equilibrium vapor pressure of the gasses tending to escape from the glass material. For example, where optical fibers 10 formed of barium flint and soda lime glasses as previously described have been fused together at a temperature of 1150° F., a fluid pressure in the zone 28 surrounding the fibers on the order of one thousand pounds per square inch has been found to cause a substantial reduction in the formation of bubbles due to expulsion of gasses from solution in the glass materials. Of course, the equilibrium vapor pressure of various gasses dissolved in the fiber materials can be different for each different gas so that the superatmospheric pressure established in the zone 28 surrounding a bundle of fibers being fused would preferably be selected to be sufficiently high to exceed the equilibrium vapor pressure of substantially all of said gasses. Preferably, the gas introduced into the housing chamber 30 for establishing the pressure zone 28 can be a gas which is readily absorbed by the fiber material under the pressures maintained in the zone 28, whereby any of said gasses which may be trapped within fiber interstices during fusion of the fibers will tend to be absorbed by the materials for permitting complete closure of the fiber interstices under the external pressures exerted on the fibers. For example, where fibers formed of the barium flint and soda lime glasses, previously suggested are to be fused together, helium gas readily absorbable by the fiber materials at very low fluid pressures can be advantageously employed in establishing and maintaining the pressure zone 28.

It should be understood that the apparatus described above for establishing and maintaining the pressure zone 28 in surrounding relation to a bundle of fibers being fused and the apparatus above described for heating the fibers to fusing temperature and for applying compressive forces to the fibers have been described by way of illustration but that any similar apparatus may be used in carrying out the method of this invention. It should also be understood that the method of this invention includes all modifications and equivalents of the above described methods which fall within the scope of the appended claims.

We claim:

A method for making a fused fiber optical image-transfer device comprising the steps of arranging a plurality of light-conducting optical fibers each embodying a core of light-transmitting glass material of relatively high index of refraction having gases dissolved therein and a cladding of light-transmitting glass material of relatively low index of refraction having gases dissolved therein in side-by-side relation in a bundle so that corresponding opposite ends of the fibers cooperate to define mosaic faces at respective opposite ends of the bundle, establishing and maintaining a superatmospheric fluid pressure in a zone imemdiately surrounding the fibers so that the surfaces of said fibers are directly subjected to said fluid pressure, said fluid pressure exceeding the equilibrium vapor pressure of said gases dissolved within said fiber glass materials at a fusing temperature of said materials, and heating the fibers to said fusing temperature while the fiber surfaces are subjected to said fluid pressure for fusing the fiber claddings together in vacuum-tight relation to each other.

References Cited

UNITED STATES PATENTS

| 2,622,779 | 12/1952 | Smith et al. | 65—32 |
| 2,992,516 | 7/1961 | Norton | 65—4 X |
| 2,992,586 | 7/1961 | Upton | 65—31 |
| 3,211,540 | 10/1965 | Cole | 65—4 |
| 3,224,851 | 12/1965 | Hicks | 65—4 |

DONALL H. SYLVESTER, *Primary Examiner.*

R. L. LINDSAY, *Assistant Examiner.*

UNITED STATES PATENT OFFICE
CERTIFICATE OF CORRECTION

Patent No. 3,355,273 November 28, 1967

Walter P. Siegmund et al.

It is hereby certified that error appears in the above numbered patent requiring correction and that the said Letters Patent should read as corrected below.

In the heading to the printed specification, lines 6 and 7, for "Warner-Lambert Pharmaceutical Company, Morris Plains, N. J.," read -- American Optical Company, Southbridge, Mass., --.

Signed and sealed this 15th day of April 1969.

(SEAL)
Attest:

Edward M. Fletcher, Jr.
Attesting Officer

EDWARD J. BRENNER
Commissioner of Patents